United States Patent [19]

Hakim et al.

[11] Patent Number: 4,841,433
[45] Date of Patent: Jun. 20, 1989

[54] METHOD AND APPARATUS FOR ACCESSING DATA FROM DATA ATTRIBUTE TABLES

[75] Inventors: Shafik J. Hakim; Mark R. Locher, both of Naperville; Kenneth Y. Nieng, Lombard; Barbara A. Vagnozzi, Naperville, all of Ill.

[73] Assignee: American Telephone and Telegraph Company, AT&T Bell Laboratories, Murray Hill, N.J.

[21] Appl. No.: 935,247

[22] Filed: Nov. 26, 1986

[51] Int. Cl.$^4$ .............................................. G06F 12/00
[52] U.S. Cl. ................................ 364/200; 364/282.1; 364/282.3; 379/269; 379/221
[58] Field of Search ... 364/200 MS File, 900 MS File, 364/300, 200, 900, 728; 379/269, 221

[56] References Cited

U.S. PATENT DOCUMENTS

| | | | |
|---|---|---|---|
| 3,253,264 | 5/1966 | Seeber et al. | 364/900 X |
| 3,366,927 | 1/1968 | Falkoff | 364/200 |
| 4,152,762 | 5/1979 | Bird et al. | 364/200 |
| 4,215,402 | 7/1980 | Mitchell et al. | 364/200 |
| 4,433,389 | 2/1984 | York et al. | 364/900 |
| 4,577,066 | 3/1986 | Bimonte et al. | 379/221 |
| 4,600,812 | 7/1986 | Gerlits | 340/827 |
| 4,606,002 | 8/1986 | Waisman et al. | 364/200 |
| 4,611,280 | 9/1986 | Linderman | 364/200 X |
| 4,700,294 | 10/1987 | Haynes | 364/200 |

OTHER PUBLICATIONS

W. Ulrich et al., "Translations In The No. 1 Electronic Switching System", *The Bell System Technical journal*, vol. XLIII, No. 5, Part 2, Sep. 1964, pp. 2549-2558.
R. Morris, "Reducing The Retrieval Time of Scatter Storage Techniques", *Communications of the ACM*, vol. 11, No. 1, Jan. 1968, pp. 105-109.

*Primary Examiner*—Thomas M. Heckler
*Assistant Examiner*—Paul Kulik
*Attorney, Agent, or Firm*—Werner Ulrich

[57] ABSTRACT

A method and apparatus for accessing data in a data base that provides for a minimum of unused storage while preserving easy expandability. A group of accessing keys are used to identify the attributes data that is being sought in a data base. In accordance with the invention, subkeys are extracted from members of the group of data accessing keys and these subkeys are advantageously rearranged to form derived accessing keys. Subkeys are densely populataed if most values of a subkey are used in most systems. One of the derived accessing keys, derived from densely populated subkeys is used for accessing the tables of data attributes that are therefore advantageously densely populated. Another derived accessing key, derived from sparsely populated subkeys, is used for accessing a sparsely populated head table. Derived keys of intermediate population density are used for accessing tables intermediate between the head tables and the tables of data attributes. The population densities of tables described above characterize a typical system even though the range of each accessing key is selected to provide for more extrmeme systems which have much larger numbers of tables of data attributes and, larger numbers of more densely populated intermediate tables. Advantageously, such an arrangement sharply reduces the amount of storage required to store data in typical systems while retaining the flexibility of permitting different accessing keys to have widely varying numbers of values in different systems.

12 Claims, 3 Drawing Sheets

METHOD AND APPARATUS FOR ACCESSING DATA FROM DATA ATTRIBUTE TABLES

TECHNICAL FIELD

This invention deals with data base systems and specifically, with improved methods and apparatus for storing and accessing sparsely populated data tables.

PROBLEM

Data tables and the data attributes stored within such tables are frequently accessed in data processing systems by means of data accessing keys. These keys frequently represent numerical values with upper and lower limits set to cover all expected values for the most extreme case. In one well-known data accessing arrangement, the members of a set of keys are used sequentially to locate o access the data attributes associated with this set of keys. A first key is used to access an entry within a head table representing the address of a first intermediate table. A second key is used to access an entry in that first intermediate table representing the address of a data attributes table. A final key is used to access the data attributes within the data attributes table. In systems which contain both random access memories and memories such as disks, the head table and intermediate tables are frequently stored in the more expensive random access memories in order to decrease the total access time to find the desired data attributes table.

Typically, such data accessing arrangements use keys, referred to hereinafter as sparsely populated keys, that have a range that is much greater than the number of values existing in a typical system. In contrast, a key whose range is close to or equal to the number of values existing in a particular system is referred to hereinafter as a densely populated key. For example, three sparsely populated data accessing keys, each representing a range of 1,024 values, might be used in a system having only 128 values for each key. In such systems, the data base is either stored using many overlapping tables wherein one table occupies the unused space of another, or, alternatively, the data base is stored using large numbers of tables which are sparsely populated by being limited to entries for only a small part of their range and are therefore wasteful of memory space. A problem of prior art data base storage arrangements is therefore that such arrangements are either complex and lead to massive undesirable rearrangements of data as the size of the range of allowed values of different keys in a particular system changes, or, alternatively, if the size of each table is fixed when that table is allocated, such arrangements waste a large amount of intermediate and/or data attributes table space.

SOLUTION

The above problem is solved and an advance is made over the prior art in accordance with the present invention wherein in one illustrative embodiment, at least two densely populated subkeys are extracted from the accessing keys; these densely populated subkeys are used, advantageously, to derive a densely populated derived key for accessing a data base table. Advantageously, such a derived key can be used for accessing a densely populated table that wastes little memory space; for example, if this derived key is used for accessing tables of data attributes, these tables will be stored efficiently, with little wasted memory space.

Illustratively, additional subkeys are extracted for deriving other derived keys which may be sparsely populated or of intermediate population density. Preferably, sparsely populated derived keys are used for accessing a head table, densely populated derived keys are used for accessing tables of attributes, and derived keys of intermediate population density are used for accessing intermediate tables. If more than one level of intermediate tables is used, first sets of intermediate tables are accessed using more sparsely populated derived keys, and last sets of intermediate tables are accessed using more densely populated derived keys. Advantageously, with such an arrangement all stored tables can be of full size, without overlap and with a minimum amount of unused memory for any given system.

Illustratively, subkeys are extracted from the original accessing keys, grouped according to expected population density in a typical system for the formation of derived keys, and concatenated in each such group to form derived keys. Advantageously, such a process minimizes the processing required to form the derived keys.

More generally, in accordance with our invention, in a data base system for storing data attributes, comprising tables including a head table and a group of tables of data attributes, wherein the data attributes are identified by a group of data accessing keys, a derived key for use in accessing a table of the data base is derived from two subkeys extracted from the group of data accessing keys.

DETAILED DESCRIPTION

Figure 1:
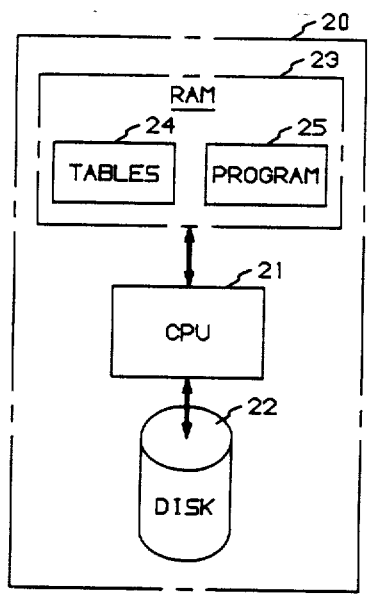
FIG. 1 is a block diagram of a processor used for accessing data in accordance with the principles of this invention.

FIG. 1 is a block diagram Of a processor for accessing data. The processor 20 includes a central processing unit 21, a random access memory 23, and a high capacity memory such as a disk 22. Stored in the random access memory are tables 24 and programs 25 for accessing these tables. The processor for this exemplary embodiment is a processor of the 5ESS TM switch, manufactured by AT&T Technologies, Inc., and described in *AT&T Technical Journal*, Vol. 64, No. 6, Part 2, pp. 1305-1564, July-August 1985.

Figure 2:
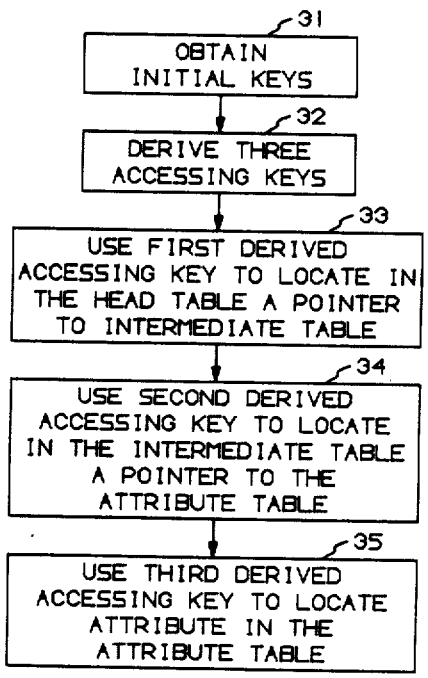
FIGS. 2 and 4 are flow diagrams of the process for accessing data.

The process of accessing data is shown on FIG. 2. The parameters used to access the data are called keys. The data to be accessed are the attributes identified by particular values of each of a group of initial keys. The initial keys are first obtained (action box 31). These keys are then subdivided to form subkeys, and the subkeys are rearranged and concatenated as discussed further with respect to FIG. 3 in order to derive a set of three derived keys (action block 32). The first derived accessing key is then used to locate, within a head table, a pointer to an intermediate table (action block 33). The second derived accessing key is then used to locate, within that intermediate table, a pointer to an attributes table (action block 34). The third derived accessing key is then used to locate the desired attribute in that attributes table (action block 35). The attributes tables are stored in either disk, and the head table and intermediate tables are stored in random access memory. For other applications, it may be desirable to store all tables in random access memory.

In this illustrative embodiment of the invention, the tables are used to store data used to derive routing and charging data in a telephone switching system. In such a system when an originating customer dials a number, the customer may dial a prefix, such as 0 or 1, to indicate, for example, whether this is a toll call and/or a call requiring operator assistance. The originating customer then dials the directory number of the terminating customer. In order to route this call appropriately and in order to charge appropriately, the class of service of the originating customer, the prefix, and the destination as specified by the terminating directory number must all be considered. The originating customer's class of service must be considered, for example, in case that customer does not have the right to dial toll calls or has the right only to dial limited classes of toll calls. Each class of service that has a different routing or charging treatment for some set of call destinations or prefixes has a different screening index. Similarly, each group of directory numbers which are routed and charged in a common fashion has a common associated destination index. The process of screening and routing is well known in the telephone system design art and is described, for example, in W. Ulrich et al., "Translations in the No. 1 Electronic Switching System," *Bell System Technical Journal*, Vol. 43, No. 5, Part 2, pp. 2533–2574, September 1964.

For the 5ESS switch, in order to retain maximum flexibility for many different types of applications, a 12-bit screening index (allowing for 4,096 different values of the screening index), a 3-bit prefix index (allowing for 8 different types of prefixes), and a 12-bit destination index (allowing for 4,096 different values of the destination index) have been provided. These indexes are the three accessing keys K1, K2, K3, from which the derived keys Q1, Q2, and Q3 are derived as described hereinafter. The attributes found in the attributes tables such as tables 8, 9, and 10, (FIG. 3) are the routing index and charging index which are used to select a route for a particular call and to select a method of charging that call. Each entry in head table 4 and intermediate tables 5 and 6 (FIG. 3) is 2 bytes long to represent the address of a block of memory, and each entry in attribute tables 8, 9, and 10 is 4 bytes long to contain a full routing index and a full charging index.

As used herein, a densely populated subkey represents that portion, typically a group of bits, of a key which varies over all or most of its range in most systems. A sparsely populated subkey represents that portion, typically a group of bits, of a key which varies over only a small fraction of its possible range of values in most systems. A subkey of intermediate population density represents that portion, typically a group of bits, of a key which has characteristics between those of the densely populated and sparsely populated subkeys; for example, a subkey of intermediate density might have only one value in many systems, but might have many values in a few systems. When a subkey is extracted from an accessing key, another subkey remains. If the remaining subkey contains more than 1 bit, another subkey can be extracted therefrom.

Subkeys are combined to form derived keys. In the present example, all subkeys are groups of one or more bits. Combination of subkeys to form derived keys is by concatenation. Alternatively, subkeys need not be groups of bits. For a data base of decimal orientation, for example, a subkey might be a decimal digit, not necessarily represented by a single group of bits which can be extracted to leave a residue that is another subkey. Also alternatively, derived keys can be formed by processes other than concatenation. For example, a derived key can be formed by multiplication of one subkey by a constant and addition of that product to another subkey. Any process which retains all the information of the original access keys in the derived keys can be used.

The terms dense, intermediate, and sparse populations refer to a typical system. In an untypical system, all values of a sparsely populated subkey may be used, so that, looking only at that untypical system, an observer might conclude that the subkey was a densely populated subkey. However, the subkeys are selected on the basis of typical system characteristics, so that most values of a densely populated subkey and few values of a sparsely populated subkey are likely to be used in most systems.

The size of a key is such as to permit some system to have all values of that key, and for that system, all values of all subkeys extracted from that key are permitted. Although 4,096 different values of the screening index are permitted in a (i.e., some) 5ESS switch, only 128 values are used in the switch of this example; while 8 different values of the prefix index are permitted, only 4 are used in the switch of this example; while 4,096 different values of a destination index are permitted, only 72 are used in the switch of this example. Thus, if the particular example system were typical, the screening index key contains a seven bit (corresponding to 128 values) densely populated portion, the prefix index contains a two bit (corresponding to 4 values) densely populated portion, and the destination index contains a six bit densely populated portion.

Figure 3:
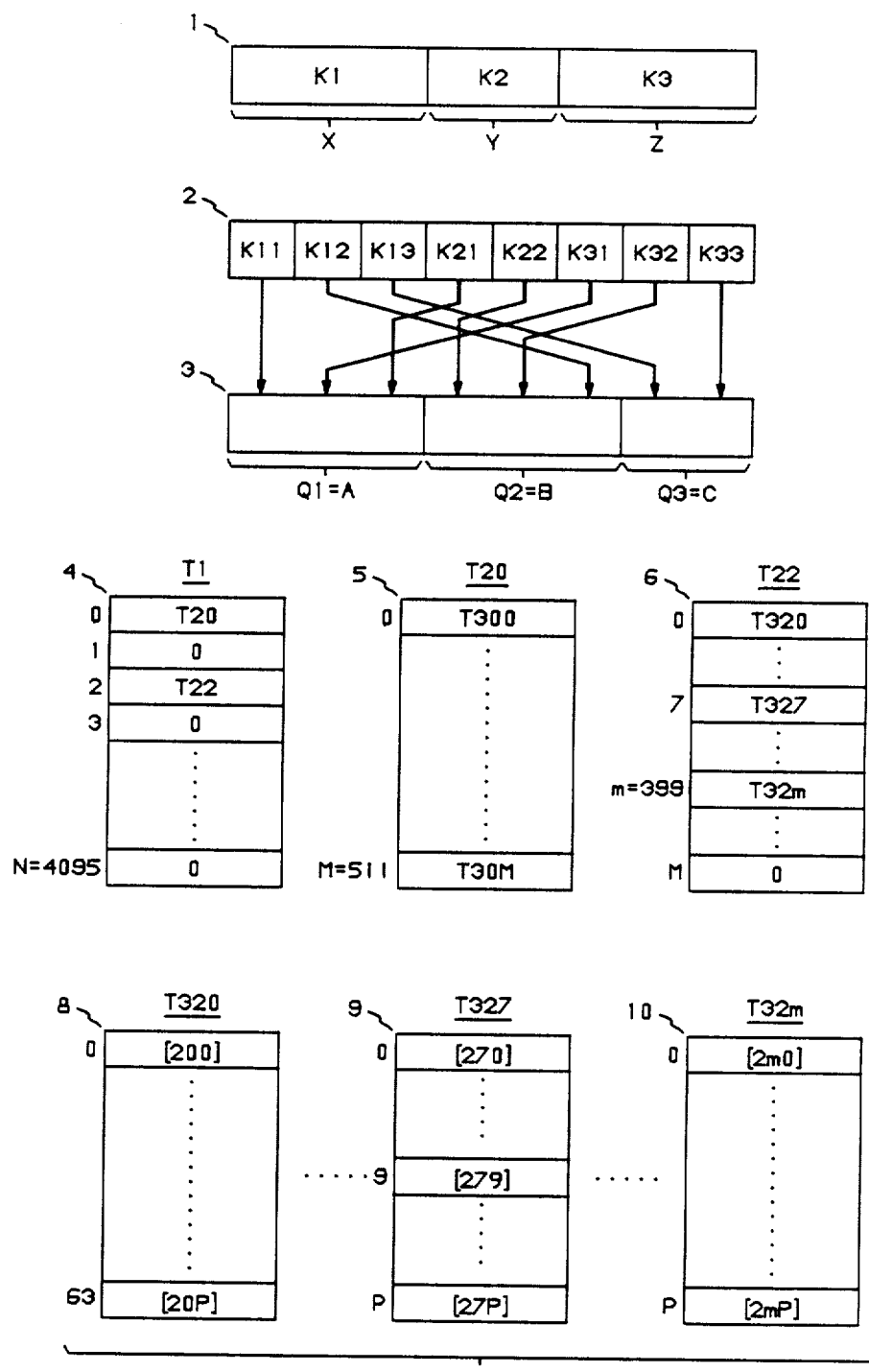
FIG. 3 is an illustrative layout of data accessing keys, derived data accessing keys and tables for accessing data in accordance with the principles of this invention.
Figure 4:
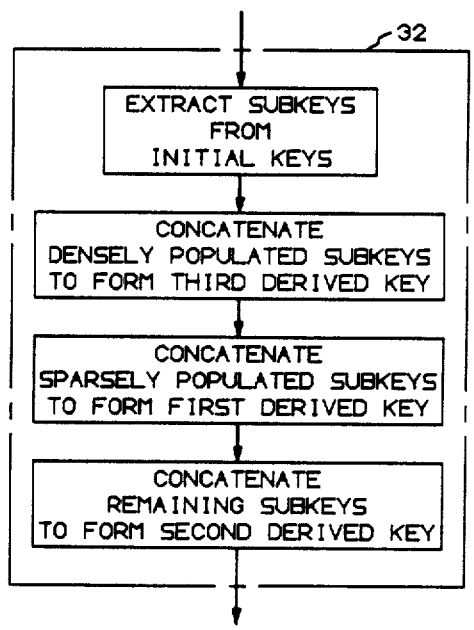

In the example illustrated in FIG. 3 a data attribute is to be accessed using keys K1, K2, and K3, shown in concatenated forms as block 1. The value of K1, the screening index, is X, the value of K2, the prefix index, is Y, and the value of K3, the destination index, is Z. For the illustrative example, X=57, Y=0, and Z=65. As illustrated in block 2, K1 is split up into three subkeys, k11, a 5-bit sparsely populated subkey, k12, a 4-bit subkey of intermediate population density, and k13, a 3-bit densely populated subkey; K2, the prefix index, is split up into two subkeys, k21, a 1-bit sparsely populated subkey, and k22, a 2-bit densely populated subkey; and K3, the destination index, is split up into three subkeys, k31, a 6-bit sparsely populated subkey, k32, a 3-bit subkey of intermediate density, and k33, a 3-bit densely populated subkey. The extraction of subkeys from K3, for example, can be explained by the fact that all 5ESS switches use at least 8 destination indexes (3-bit densely populated subkey k33), many contain far fewer than 64 destination indexes (3-bit intermediate population subkey k32), and a requirement has been established to provide up to 4,096 destination indexes (12 bits required) for unusual applications of a 5ESS switch (leaving a 6-bit sparsely populated subkey k31).

As illustrated in block 3, derived keys, Q1, Q2, and Q3, are then derived from these subkeys. Specifically, Q1, the 12-bit derived key for accessing the least densely populated table, is derived by concatenating k11, k31 and k21 and has a maximum value (N) of 4,095; Q2, the 9-bit derived key for accessing tables populated with intermediate density, is derived by concatenating k22, k32 and k12 and has a maximum value of (M) of 511; and Q3, the 6-bit derived key for accessing the most densely populated tables is derived by concatenating k13 and k33, and has a maximum value (P) of 63. The values of Q1, Q2, and Q3 are A, B, and C, respectively. The values of A, B and C corresponding to X=57, Y=0, Z=65 are A=2, B=7 and C=9.

A, the value of Q1, is used to locate the appropriate entry in the head table, T10 (block 4). In that table the A'th or second entry has the value T22, which is a pointer to table T22 (block 6). B, or in this case, 7, the value of Q2 is used for locating the appropriate entry in table T22; in that table, the B'th or 7th entry has a value T327, the address of attributes table T327 (block 9). This attributes table is then accessed using C, the value of Q3, in this case 9, to find the attributes associated with derived keys A, B, C, the values that correspond to the values X, Y and Z of the original keys. These attributes are the data which was requested by the program (not shown) that requested the data search.

Observe how this arrangement minimizes the total amount of memory used while retaining a simple memory accessing scheme. The initial table set, consisting of a single head table, Table T1 (block 4), is the only table set with an entry for every possible value of the range of the associated derived key; since T1 is a single table, this is accomplished at relatively low cost by providing that table with an entry for every possible value of the first derived key 01. Intermediate tables T20 and T22 (blocks 5 and 6) are the only intermediate tables in this example; they are provided for those cases which correspond to a non-zero entry in Table T1. In this example system, which has no pointers in the positions beyond 2 of table T1, table T22 would be the last of the intermediate tables. There are no pointers in the positions beyond 2 since the allowed values of X, Y, and Z do not correspond to any value of Q1 greater than 2. Since the value of 1 does not exist for Q1 in this system (because the prefix index is limited to 4 values, so that the most significant bit of this index, which is also the least significant bit of Q1, is never 1), no T21 table is required. The individual attributes tables are also only provided for those cases which correspond to possible values, in a particular system, of Q1 and Q2. Since Q3 is the most densely populated of all the derived keys, most of the entries in the T3 tables are utilized, thus optimizing the use of memory for storing the attribute relationships. The T3 tables are by far the largest portion of the total memory required for accessing and storing the attributes relationships.

In this example, as previously stated, T1 contains only two non-zero entries, the pointers to tables T20 and T22. Table T20 contains 512 non-zero entries, since for the case Q1=0 (which corresponds in this example to K3<64), the full range of values of Q2 from 0 to a maximum, M, of 511 is possible. However, Table T22 contains only 64 non-zero entries, with an upper limit of m=399 corresponding to the last non-zero entry; Table T22 corresponds to values of 72>K3<64, thus limiting the three bits that form k32 to the values 000; the other subkeys that form Q2, namely, k22 and k12, can vary over their entire range. Thus, tables T20 and T22 contain a combined total of 576 pointers to 576 T3 tables, each containing 64 entries of 4 bytes each. The total size of the T3 tables is therefore $$576 \times 64 \times 4 = 144K \text{ bytes.}$$

To illustrate how memory may be saved using this invention, consider the present example in which the three keys, K3, K2, K1 are 12, 3 and 12 bits long, respectively. The derived keys are derived as described above with the result that Q3, Q2 and Q1 are 12, 9, and 6 bits long, respectively. Each entry in tables 4, 5, and 6, is 2 bytes long and each entry in tables 8, 9, and 10 is 4 bytes long. In this particular 5ESS switch, the range of K1 is 128 possible values, the range of K2 is 4 possible values, and the range of K3 is 72 possible values. The length in bytes required for tables using the original keys is as follows, wherein 1K=1,024: table T1 is 8K bytes long, tables T2 are (128 tables)×(8 entries/table)×(2 bytes/entry) or 2K bytes long, and tables T3 are (512 tables)×(16K bytes/table) or 8,192K bytes long. In contrast, using the derived keys, the length of table T1 remains 8K bytes, the length of the two intermediate tables is 2K bytes, and the length of tables T3 is 144K bytes.

While the illustrative example has shown a data accessing arrangement using three levels of access and using three derived keys, the same arrangement can be used, in this case with far more memory, with two derived keys, effectively eliminating the need for the intermediate tables such as T20 and T22. Alternatively four or more derived keys and steps can be used for accessing the attributes data. The first derived key is then used for accessing a head table, the second derived key is then used for accessing one of a first set of intermediate tables, the second derived key is used for accessing one of a second set of intermediate tables, . . . , the last derived key is used for accessing an attributes table whose address was located using the next to last derived key. For example, in the system described herein, if Q1 were broken down into two keys of six bits each, the size of the tables corresponding to T1 would be only two tables each of 64 2-byte entries or 256 bytes instead of the 8,192 bytes of table T1. The disadvantage of such an approach is that a 4-level data accessing operation is required. A 4-level accessing arrangement consumes more time in each data accessing operation than does a 3-level accessing operation; further, the process of adding memory tables as the range of keys is increased and the auditing process for a 4-level data accessing operation are likely to be more complex.

In the illustrative example, the attributes data is stored in the final table. Alternatively, it is possible to store a pointer to such attributes data in the last table; this approach is useful where many data items share particular attributes or where the size of the attributes data varies widely. While a disk was shown for storing the attributes tables, in other applications random access memory may be more appropriate for storing such attributes data or pointers to the attributes data.

The arrangements described herein for extracting subkeys and combining the extracted subkeys to form derived keys for actually accessing data can be used in other data base arrangements wherein data is identified by a group of initial keys, but can be more advantageously accessed using derived keys. The process saves most memory in typical systems if extracted keys are combined with other extracted keys of similar population density, and if sparsely populated derived keys are used for accessing small numbers of tables and densely populated derived keys are used for accessing large numbers of tables.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. In a data base system for storing data attributes, said data base system comprising data tables comprising a head table and a plurality of tables of data attributes, each of said tables of data attributes comprising a plurality of slots, and wherein each of said data attributes is identified by a plurality of data accessing keys, a method of accessing data attributes in said plurality of tables of data attributes, comprising the steps of:
    extracting at least two fixedly selected subkeys from different ones of said plurality of data accessing keys; and
    deriving a first derived key for accessing one of said tables of said data base by combining data of said extracted subkeys;
    wherein every slot of each of said tables of attributes corresponds to only one set of values of said plurality of data accessing keys.

2. The method of claim 1 further comprising the steps of:
    extracting at least two additional subkeys from different ones of said plurality of data accessing keys; and
    deriving a second derived key, for accessing another of said tables of said data base, by combining data of said extracted additional subkeys.

3. In the data base system of claim 2, further comprising intermediate accessing tables, located via said head table and used for locating said attributes tables, the method of claim 2 wherein said second derived key is used for accessing one of said attributes tables.

4. The method of claim 3 further comprising the step of:
    extracting at least two further subkeys from said plurality of data accessing keys; and
    deriving a third derived key, for accessing said head table, from all of said further subkeys.

5. The method of claim 1 wherein said deriving step comprises the step of concatenating said extracted subkeys.

6. A data base system comprising:
    processor means controlled by a program; and
    data tables, comprising a head table and a plurality of tables of data attributes, each of said tables of data attributes comprising a plurality of slots, and wherein each of said data attributes is identified by a plurality of data accessing keys;
    said processor means controlled by said program for extracting at least two fixedly selected subkeys from said plurality of data accessing keys, and for deriving, by combining data of said extracted subkeys, a derived key for accessing one of said data tables;
    wherein every slot of each of said tables of attributes corresponds to only one set of values of said plurality of data accessing keys.

7. The system of claim 6 wherein said processor means is further controlled by said program for extracting at least two additional subkeys from said group of data accessing keys and deriving from a plurality of said extracted additional subkeys a second derived key for accessing another table of said data tables.

8. The system of claim 7 wherein said data tables further comprise intermediate accessing tables, located via said head table, used for locating said plurality of attributes tables, and wherein said processor means is further controlled by said program, for accessing one of said intermediate accessing tables using said second derived key and for accessing one of said tables of data attributes using said first derived key.

9. The system of claim 8 wherein said processor means is further controlled by said program for extracting at least two further subkeys from said plurality of data accessing keys for deriving a third derived key, for accessing said head table, from a plurality of said extracted further subkeys.

10. The system of claim 6 wherein said processor means is further controlled by said program for deriving said first derived key by concatenating said extracted subkeys.

11. In a data base system for storing data attributes, said data base system comprising data tables comprising a head table and a plurality of tables of data attributes, each of said tables of data attributes comprising a plurality of slots, and wherein each of said data attributes is identified by a plurality of data accessing keys, a method of accessing data attributes in said plurality of tables of data attributes comprising the step of:
    extracting at least two fixedly selected densely populated subkeys from different ones of said plurality of data accessing keys; and
    deriving a first derived key for accessing a table of said data base by combining data of said extracted subkeys;
    wherein every slot of each of said tables of attributes corresponds to only one set of values of said plurality of data accessing keys.

12. In a program controlled by telephone switching system comprising data tables, said data tables comprising a head table, a group of intermediate tables and a group of attributes tables, data stored i said attributes tables comprising routing index data and charging index data a method of accessing routing index data and charging index data from a prefix index, a screening index and a destination index comprising the steps of:
    extracting low order bits from said screening index and said destination index, and concatenating said low order bits to derive at least part of a first derived kay;
    extracting high order bits from said screening index and said destination index and concatenating said high order bits to derive at least part of a second derived key;
    extracting at least two bits, not extracted for deriving said first and said second derived key, and concatenate said at lea two bits to derive at least part of a third derived key;
    accessing said head table, using said second derived key, to locate an indicator of an address of one table of said group of intermediate tables;
    accessing said one table of said group of intermediate tables using said third derived key to locate an indicator of an address of another table of said groups of intermediate tables and attributes tables; and
    accessing one table of said group of attributes tables using said first derived key to locate said route index and said charging index.

* * * * *

UNITED STATES PATENT AND TRADEMARK OFFICE
CERTIFICATE OF CORRECTION

PATENT NO. : 4,841,433

DATED : June 20, 1989

INVENTOR(S) : Shafik J. Hakim, Mark R. Locher, Kenneth Y. Nieng, Barbara A. Vagnozzi It is certified that error appears in the above-identified patent and that said Letters Patent is hereby corrected as shown below:

Column 7, claim 3, line 39, delete "attributes tables" and substitute

--intermediate accessing tables, and said first derived key is used for accessing one of said attributes tables--.

Column 8, claim 12, line 37, delete "by".

Column 8, claim 12, line 40, delete "i" and substitute --in--.

Column 8, claim 12, line 42, after first occurrence of "data" insert a comma.

Column 8, claim 12, line 48, delete "kay" and substitute --key--.

Column 8, claim 12, line 55, delete "lea" and substitute --least--.

Signed and Sealed this

Fifteenth Day of May, 1990

*Attest:*

HARRY F. MANBECK, JR.

*Attesting Officer*     *Commissioner of Patents and Trademarks*